June 27, 1961 C. B. YOUNT 2,990,200
FLUID PRESSURE SEAL FOR A THREADED JOINT
Filed Oct. 9, 1957 2 Sheets-Sheet 1

INVENTOR.
CLARENCE B. YOUNT
BY Wade Koontz
Mark C. Leach
ATTORNEYS

June 27, 1961  C. B. YOUNT  2,990,200
FLUID PRESSURE SEAL FOR A THREADED JOINT
Filed Oct. 9, 1957  2 Sheets-Sheet 2

INVENTOR.
CLARENCE B. YOUNT
BY Wade Koontz
Frank C. Leach Jr.
ATTORNEYS

United States Patent Office 2,990,200
Patented June 27, 1961

2,990,200
FLUID PRESSURE SEAL FOR A
THREADED JOINT
Clarence B. Yount, Dayton, Ohio
Filed Oct. 9, 1957, Ser. No. 689,250
5 Claims. (Cl. 285—342)
(Granted under Title 35, U.S. Code (1952), sec. 266)

The invention described herein may be manufactured and used by or for the United States Government for governmental purposes without payment to me of any royalty thereon.

This application is a continuation in part of patent application Serial No. 507,517, filed May 10, 1955, and now abandoned, entitled "Fluid Pressure Seal." This invention relates to a fluid pressure seal for a threaded joint and, more particularly, to a seal for a threaded joint that maintains a sealing effect under extreme pressure and temperature conditions.

The fluid pressure lines in jet aircraft and missiles, for example, are subject to extreme temperature conditions. This is due to the fact that the aircraft and missiles may ascend to very high altitudes where extreme cold temperature conditions exist or may operate in areas where extreme cold temperature conditions exist on the surface of the earth. Some of the fluid pressure lines are also subject to extreme high temperature conditions due to the fact that they may be located near the exhaust of the jet, for example. Another source of extreme high temperature conditions adjacent a fluid line is due to the friction of the air on the wings caused by the high speeds of the aircraft and the missiles.

These extremely low and high temperature conditions (below —65° F. and above 250° F.) create the problem of how to maintain a seal at the threaded joint of two members of a fluid pressure line. While seals made of elastomeric compounds, such as rubber have been successful in maintaining a sealing effect at extremely low conditions, the physical limitations of such seals have prevented their effectiveness at extremely high temperatures. Accordingly, the present invention solves this problem by providing a seal, which is made of the same material as the members of the joint so that expansion or contraction of the members due to extreme temperature conditions will produce the same expansion or contraction of the seal.

The primary object of this invention is to provide a fluid pressure seal that maintains a seal of a threaded joint against high pressure fluid under extreme temperature conditions.

Other objects of the invention will be readily perceived from the following description.

This invention relates to means for sealing the threaded joint between a male conduit member and a female member. The male member has a circular portion adapted to be screwed into the threaded aperture of the female member, which has a conical counterbore at the entrance to the threaded aperture. The male member has a smooth annular portion, which is smaller in diameter than the threaded portion, adjacent its threaded portion. A sealing ring, which initially is in the form of a first portion having a sharp edge and a second portion angularly extending therefrom, has a central bore of sufficient diameter to pass over the threads of the threaded portion of the male member. Abutment means on the male member cooperate with the female member when there is relative movement between the abutment means and the female member to cause the apex formed at the juncture of the angle between said first and second portions of the sealing ring to contact the conical counterbore in the threaded aperture of said female member. Continued pressure exerted by the abutment means forces the sharp edge of the first portion of the sealing ring into biting engagement with the smooth annular portion of the male member to effect a fluid pressure seal and engagement of the apical portion of the sealing ring with the conical counterbore of the threaded aperture of the female member completes the seal against leakage of the pressure along the threaded joint between the male and female members.

The accompanying drawing illustrates the preferred embodiments of the invention, in which.

Figure 1:
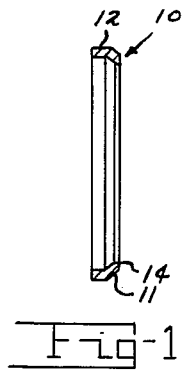
FIG. 1 is a sectional view of the seal of the present invention.

Referring to the drawing and particularly FIG. 1, there is shown a sealing ring 10 having a first portion 11 and a second portion 12. As clearly shown in FIG. 1, the portion 11, which has a sharp edge 14, is disposed at an angle to the portion 12.

Figure 4:
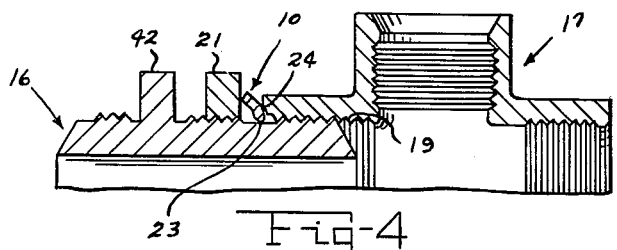
FIG. 4 is a sectional view of the seal and the two connecting members with the seal effectively sealing the threaded joint between the members.
Figure 5:
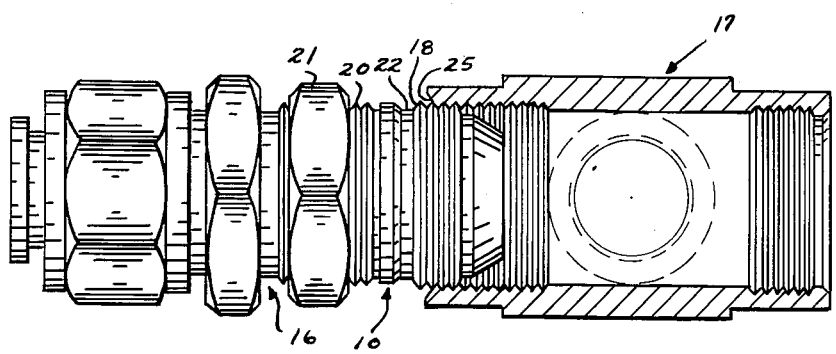
FIG. 5 is a view partly in section and partly in plan of the seal and the connecting members in their assembled relation prior to the seal being moved to its effective sealing position.

As shown in FIGS. 4 and 5, the ring 10 is employed to provide a seal between the threaded joint of two connecting members 16 and 17 of a fluid pressure line as shown in FIGS. 4 and 5. The members 16 and 17 are joined together by cooperating threads 18 on a circular threaded portion of the male member 16 and threads 19 on the interior of the female member 17 to form a threaded aperture. The ring 10 has a central bore of sufficient diameter so that the ring 10 passes over the threads 18 before the members 16 and 17 are connected together. The male member 16 has a second set of threads 20 spaced from the threads 18 with a smooth annular portion 22 therebetween. A locking nut 21 having a smooth, radially extending face is screwed on the threads 20. While the portion 22 is shown having the same diameter as the root diameter of the threads 18, it will be understood that the diameter of the portion 22 may be larger or smaller, if desired.

After the members 16 and 17 have been joined together by their threads 18 and 19 to form the threaded joint, the nut 21 is advanced along its threads 20 to exert a force against the second portion 12 of the ring 10. This results in the edge 14 of the ring 10 biting into the smooth portion 22 of the male member 16 between the threads 18 and 20 to seal the member 16 as shown at 23 (see FIG. 7).

Figure 7:
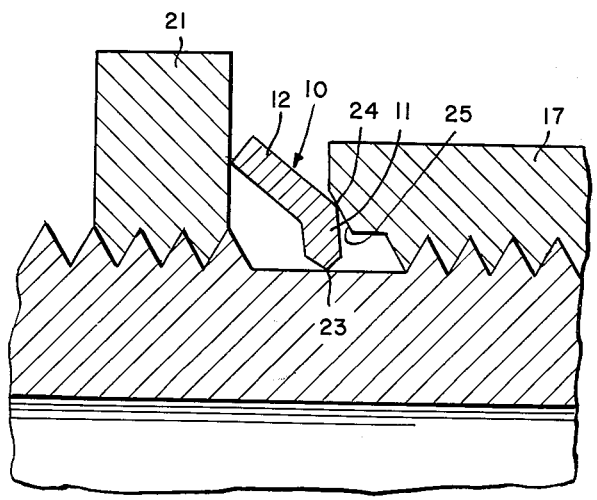
FIG. 7 is similar to FIG. 4 and represents an enlarged view showing the relationship between the two connecting members and the seal in greater detail.

The force produced by the nut 21 acting against the second portion 12 causes the apical portion formed at the juncture as indicated at 24 between said first and second portions to bear against a conical counterbore 25 of the female member 17 adjacent the entrance of the threaded aperture to seal the member 17 as shown at 24 (see FIG. 7). This force created by the nut 21 results in the ring 10 being deformed to the position of FIG. 3, if the angle of the counterbore 25 with respect to the longitudinal axis of the member 17 is not greater than the angle of the portion 11 with respect to the axis of the ring 10. When the ring 10 is in its sealing position, the ring is sprung due to contacts at 23 and 24 and its engagement with the nut 21 whereby vibrations will not loosen the members 16 and 17. The angle of portion 11 with respect to the axis of the male member 16 is generally an acute angle when the ring 10 is in the sealing position, as indicated in FIGURES 4 and 7. This is to insure that when fluid pressure from within the conduit members exerts a force on the sealing ring, the force will be in such a direction as to improve the seal of the ring.

However, if the angle of the counterbore 25 with respect to the axis of the fitting is greater than the angle of the portion 11 with respect to the axis of the ring 10, it is necessary to preform the ring 10 so that the angle of the portion 11 with respect to the longitudinal axis of the ring 10 is greater than the angle of the counterbore 25 with respect to the longitudinal axis of the fitting 17. This is to insure that the ring 10 bites into the annular portion 22 and makes contact with the counterbore 25 when the nut 21 applies force against the ring 10.

Figure 2:
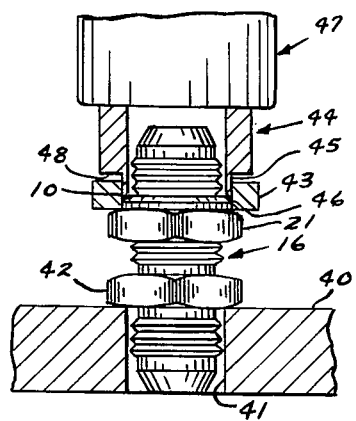
FIG. 2 is a sectional view of a device for preforming the sealing member of FIG. 1.
Figure 3:
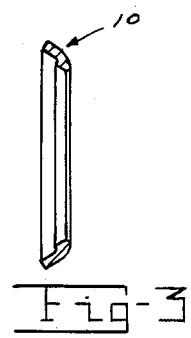
FIG. 3 is a sectional view of the seal after it has been formed by the device of FIG. 2.

A device for preforming the ring 10 of FIG. 1 into the sealing form of FIG. 3 is shown in FIG. 2. The device includes a press bed 40 having an opening 41 into which one end of the male member 16 is disposed. The male member 16 has an abutment 42, which bears against the press bed 40. The ring 10 passes over the exposed end of the member 16 and bears against the nut 21. An annular member 43 surrounds the ring 10 and has substantially the same diameter. A presetting tool 44 has a reduced portion 45, which slides within the interior of the member 43. The reduced portion 45 has a beveled end 46 having an angle with respect to the longitudinal axis of the presetting tool smaller than the angle of the portion 11 of the ring 10.

The tool 44 has its beveled end 46 urged into engagement with the apex of the angle of the portions 11 and 12 of the ring 10 by a press ram 47. As the tool 44 moves downwardly, the portion 11 of the ring is bent inwardly about its inner end towards the axis of the ring by the tool 44 acting against the apical portion of ring 10, causing the portion 12 to be also bent inwardly towards the axis of the ring. Engagement of a shoulder 48 of the tool 44 with the member 43 stops the preforming of the ring 10. The length of the reduced portion 45 is such that the shoulder 48 contacts the member 43 before the beveled edge 46 engages the nut 21 so that the angle of the portion 12 of the preformed ring 10 to its axis is less than the angle of the counterbore 25.

For example, when the device of FIG. 2 is used with a fitting 16 having threads, which are spaced sixteen to the inch, with an outer diameter of .750", the outer diameter of the portion 12 of the ring 10 is .885", the inner diameter of the portion 12 is .807", the minimum diameter of the ring 10 is .750", the length of the inner side of the portion 12 is .054", the length of the outer side of the portion 12 is .072", and the total length of the ring 10 is .107". The portions 11 and 12 of the ring 10 are at an angle of 50° with respect to each other. With a ring of these measurements, the tool 44 has an inner diameter of .750", an outer diameter of 1¹¹⁄₆₄", and an overall length of 1.750". The reduced portion 45 of the tool 44 has a length of .250" while the length of the member 43, which has an inner diameter of .888", is .265".

These dimensions result in the device of FIG. 2 presetting the ring 10 so that the angle of the portion 12 to the axis of the ring 10 is less than the angle of the counterbore 25 to the axis of the fitting 17. It also results in the angle of the portion 11 to the axis of the ring 10 being greater than the angle of the counterbore 25. The angle between the two portions 11 and 12 remains substantially the same throughout the presetting so that the portion 11 is nearly perpendicular to the axis of the fitting 17 whereby the edge 14 easily bites into the annular portion 22 when force is applied by the nut 21. As the nut 21 applies force to the ring 10, the apex of the angle of the portions 11 and 12 contacts the counterbore 25 to form a seal therebetween as described with respect to FIGS. 4 and 5. It should be noted that the engagement of the nut 21 with the portion 12 to apply force to the ring 10 also forms a seal therebetween.

It will be understood that the ring 10 and the members 16 and 17 are made of the same material such as steel or aluminum, for example, depending on the pressure that it is desired for the members to withstand. This, of course, results in the ring 10 and the members 16 and 17 expanding or contracting the same amount during the temperature changes so that the seals 23 and 24 are maintained against the high fluid pressure encountered, for example, 3,000 p.s.i. While the female member has been shown as a T, it will be understood that any other type of fitting could be employed, if desired.

Figure 6:
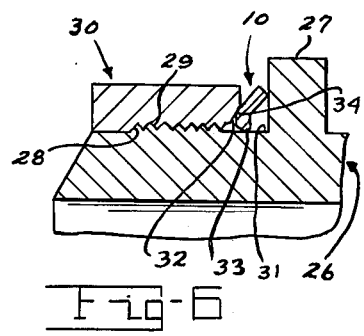
FIG. 6 is a sectional view of another relationship of the seal and the two connecting members with the seal effectively sealing the threaded joint therebetween.

Another use of the sealing member is shown in FIG. 6 wherein a male member 26 has a fixed abutment portion 27 thereon. The male member 26 has a threaded portion with threads 28 for engaging threads 29 on a female member 30 to form a threaded joint therebetween. The male member 26 has a smooth annular portion 31 between the abutment portion 27 and the circular threaded portion. The female member 30 has a conical counterbore 32, which is disposed adjacent the entrance of the threaded aperture formed in the female member by the threads 29 in the interior thereof.

The ring 10 has a bore of sufficient diameter to pass over the threads 28. The seal is disposed with the portion 12 engaging the abutment portion 27 of the male member 26 while the sharp edge 14 is placed in contact with the smooth annular portion 31. As the female member 30 is threaded onto the male member 26, there is relative movement between the female member 30 and the abutment member 27 of the male member 26 since the abutment member is stationary. This relative movement results in the conical counterbore 32 of the female member 30 engaging the ring 10 to create a force on the ring to produce relative movement between the portions 11 and 12. Movement of the female member 30 towards the abutment portion 27 results in a forming action on the ring 10 so that its edge 14 bites into the smooth annular portion 31 at 33 to form a seal at this point. The force created between the abutment portion 27 and the female member 30 due to the relative movement therebetween results in the conical counterbore 32 bearing against the second portion 12 to seal the female member 30 as shown at 34. The force created by the relative movement between the abutment portion 27 and the female member 30 results in the ring 10 being deformed to the position of FIG. 3 in the same manner as set forth in the description above with respect to FIGS. 4 and 5, if the angle of the counterbore 32 is not greater than the angle of the portion 11 with respect to the axis of the ring 10. Otherwise, it is necessary to preform the ring by inserting one end of the fitting 26 into the press bed 40 and employing the presetting tool 44 as previously described.

The present invention has the advantage of sealing the threaded joint of two members under temperature and pressure conditions equal to the physical limitations of the members.

For purposes of exemplification, a particular embodiment of the invention has been shown and described according to the best present understanding thereof. However, it will be apparent that changes and modifications in the arrangement and construction of the parts thereof may be resorted to without departing from the true spirit and scope of the invention.

I claim:

1. Means for sealing the threaded joint between a male conduit member and a female member, said male member having a circular threaded portion adapted to be screwed into a threaded aperture of the female member, said female member having a conical counterbore at the entrance to the threaded aperture, said male member having a smooth annular portion adjacent its threaded portion said smooth annular portion being substantially equal in diameter to the root diameter of said threaded portion and adapted to extend out of said threaded aperture, a sealing member adapted to seal the threaded joint against fluid pressure, said sealing member comprising a yieldable metallic annular sealing ring having a first portion initially in the form of a hollow truncated cone with a central bore of sufficient diameter to pass over the threaded portion of said male member and an integrally connected second portion initially in the form of a hollow cylinder axially parallel to said male member, said first portion terminating in a peripheral sharp edge adapted for biting engagement with said smooth annular portion of said male member, an annular locking means threadedly mounted on said male member for axial movement thereon relative to said female member, said male member having locking means having a smooth, radially extending face adapted for abutting engagement with said second portion of said sealing ring, the juncture of said first portion and said second portion defining a peripherally continuous apex adapted for sliding engagement with said conical counterbore of said female member, said locking means being movable relative to said female member to contact said second portion of said sealing member, whereby said apex of said sealing ring engages said conical counterbore of said female member to impart rotational movement to said sealing ring toward said female member about said apex, continued movement of said locking means relative to said female member causing said sharp edge of said first portion of said sealing ring to be cammed into biting engagement with said smooth annular portion of said male member, further relative movement of said abutment means toward said female member causing said sealing ring to be deformed in such manner that said second portion of said sealing ring is conically flared relative to the axis of said male member and said first portion of said sealing ring is urged into deeper biting engagement with said smooth annular portion for completing the sealing relationship between the said male member and said female member, said first portion of said sealing member forming an acute angle with the axis of said male member, whereby fluid pressure within said female member will improve the sealing relationship between said sealing member and said male member, the sealing member and the male and female members being the same material to maintain the seal-relationship under all temperature conditions.

2. Means for sealing the threaded joint between a male conduit member and a female member, said male member having a circular first threaded portion adapted to be screwed into a threaded aperture of the female member, said female member having a conical counterbore at the entrance to the threaded aperture, said male member having an axially spaced second threaded portion thereon with a smooth annular portion therebetween, said smooth annular portion having a diameter substantially equal to the root diameter of the first threaded portion, said second threaded portion adapted to receive an axially movable lock nut thereon said lock nut having a smooth, radially extending face, a yieldable metallic sealing ring comprising a conical first portion having a central bore therethrough of sufficient diameter to pass over said first threaded portion of said male member and an integrally connected substantially cylindrical second portion, the juncture of said first portion and said second portion defining a peripherally continuous apex adapted for sliding engagement with said conical counterbore of said female member, said first portion terminating in a peripherally continuous sharp edge adapted for biting engagement with the smooth annular portion of said male member, said sealing ring being initially positioned axially of said male member adjacent said smooth annular portion thereof to establish an angular relation relative to the axis of said male member between the first and second portions of said sealing ring and the conical counterbore of said female member such that the angle of said conical counterbore of said female member is less than the angle of said first portion of said sealing ring and greater than the angle of said second portion of said sealing ring, whereby said lock nut is advanced along said second threaded portion to abut said second portion of said sealing ring causing said apex of said sealing ring to contact said conical counterbore of said female member for sliding pivotal movement thereon, said second portion of said sealing ring riding up on the face of said lock nut to force said sharp edge of said first portion of said sealing ring into biting engagement with said smooth annular portion of said male member to deform said sealing ring to effect a fluid pressure seal along the threaded joint between the male and female members responsive to the exertion of continuous pressure by said lock nut.

3. Means for sealing the threaded joint between a male conduit member and a female member, said male member having a circular threaded portion adapted to be screwed into a threaded aperture of the female member, said female member having a conical counterbore at the entrance to the threaded aperture, said male member having a smooth annular portion adjacent its threaded portion, said smooth annular portion having a diameter substantially equal to the root diameter of the threaded portion, a sealing member adapted to seal the threaded joint against fluid pressure, said sealing member including a yieldable metallic sealing ring positioned axially of said male member and juxtaposed with said smooth annular portion thereof, said sealing ring comprising a frusto-conical first portion terminating in a peripherally continuous sharp edge adapted for biting engagement with said smooth annular portion of said male member and a substantially cylindrical second portion integrally connected to said first portion in angular relation thereto, said first portion of said sealing ring having a central bore therethrough to allow said sealing ring to initially pass over said circular portion of said male member, the juncture of said first portion and said second portion of said sealing ring defining a peripherally continuous apical portion adapted for sliding engagement with said conical counterbore of said female member, an abutment portion positioned on said male member normal to the axis thereof and adapted for abutting engagement with said second portion of said sealing ring, contact being made between said apical portion of said sealing ring and said conical counterbore of said female member in response to advancement of said female member along the circular threaded portion of said male member causing said second portion of said sealing ring to abut said abutment portion, said second portion of said sealing ring and said conical counterbore of said female member having such an angular relationship to cause said sealing ring to be rotated about the point of contact between said apical portion and said conical counterbore of said female member forcing said sharp edge of said first portion of said sealing ring into biting engagement with said smooth annular portion of said male member and causing said sealing ring to be deformed responsive to the application of continuous force against said sealing ring to establish a fluid pressure seal between said male member and said female member, and the sealing member and the threaded member being the same material to maintain the sealing relationship under all temperature conditions.

4. Means for sealing the threaded joint between a male conduit member and a female member, said female member having a circular threaded aperture, said male member having a circular threaded portion adapted to be screwed into the threaded aperture of said female member, a smooth annular portion adjacent said circular threaded portion adapted to extend out of said threaded aperture, said smooth annular portion having a diameter substantially equal to the root diameter of the threaded portion, said female member having a conical counterbore at the entrance to the threaded aperature, a yieldable metallic sealing ring comprising an inwardly extending first portion and an integrally connected second portion extending in angular relation to said first portion, said first portion terminating at its innermost periphery in a single continuous sharp edge, said second portion joining said first portion at the outermost periphery of said first portion to define a peripherally continuous apical portion therebetween, said apical portion being adapted for sealing engagement with the counterbore of said female member, said second portion initially extending in parallel relation to the axis of said male member, said sealing ring having a central bore adapted to pass over said male member threaded portion, a locking means mounted on said male member movable relative to said female member and having a smooth, radially extending face thereon normal to the axis of said male member, the face of said locking means being adapted for abutting engagement with said second portion of said sealing ring whereby said locking means is moved into abutting engagement with said second portion of said sealing ring to urge said apical portion against said counterbore of said female member into sealing relation therewith, said second portion of said sealing ring riding up the smooth face of said locking means to rotate said sealing ring to cause the sharp edge of the first portion of said sealing ring to be cammed into sealing engagement with the smooth annular portion of said male member for completing the seal against leakage of fluid under pressure along the threaded joint between the male and female members.

5. Means for sealing the threaded joint between a male conduit member and a female member, said male member having a circular threaded portion adapted to be screwed into a threaded aperture of the female member, said female member having a conical counterbore at the entrance to the threaded aperture, said male member having a smooth annular portion adjacent its threaded portion adapted to extend out of said threaded aperture, said smooth annular portion having a diameter substantially equal to the root diameter of said threaded portion, an annular sealing member adapted to seal the threaded joint against fluid pressure, said sealing member comprising a pair of integrally connected angularly related portions, a first one of said portions terminating in a sharp edge adapted for biting engagement with said smooth annular portion of said male member, the second of said pair of portions joining said first portion to form an apical surface therebetween, an annular locking means threadedly engaged with said male member and having a smooth, radially extending face thereon adapted for abutting engagement with said second portion of said sealing member, the apical surface of said sealing member being adapted to contact the counterbore in said female member in camming relation thereto in response to the engagement of said locking means and said second portion of said sealing member to cause said second portion of said sealing member to ride up on the smooth face of said locking means rotating said sealing member and causing said sharp edge of said first portion of said sealing member to bite into said smooth annular portion of said male member for effecting a sealing relationship between said male member and said female member, said first portion of said sealing member forming an angle with the axis of said male member when in sealing relation with said male member whereby fluid pressure from within said female member will improve the sealing relationship between said sealing member and said male member, the sealing member and the male and female members being of the same material to maintain the relationship under all temperature conditions.

References Cited in the file of this patent

UNITED STATES PATENTS

| 1,063,926 | Schuermann | June 3, 1913 |
| 2,343,235 | Bashark | Feb. 29, 1944 |
| 2,466,527 | Wolfram | Apr. 5, 1949 |
| 2,484,815 | Crawford | Oct. 18, 1949 |
| 2,693,374 | Wurtzburger | Nov. 2, 1954 |
| 2,693,375 | Wurtzburger | Nov. 2, 1954 |
| 2,695,796 | Woodling | Nov. 30, 1954 |
| 2,704,676 | Harding | Mar. 22, 1955 |
| 2,761,704 | Crawford | Sept. 4, 1956 |
| 2,826,438 | Woodling | Mar. 11, 1958 |

FOREIGN PATENTS

| 198,232 | Switzerland | Sept. 1, 1938 |